(12) United States Patent
Hsu et al.

(10) Patent No.: US 11,127,331 B2
(45) Date of Patent: Sep. 21, 2021

(54) DISPLAY DEVICE

(71) Applicant: Au Optronics Corporation, Hsinchu (TW)

(72) Inventors: Ya-Ling Hsu, Hsinchu (TW);
Yueh-Hung Chung, Hsinchu (TW);
Min-Tse Lee, Hsinchu (TW);
Chen-Hsien Liao, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 0 days.

(21) Appl. No.: 17/092,317

(22) Filed: Nov. 8, 2020

(65) Prior Publication Data

US 2021/0174721 A1 Jun. 10, 2021

Related U.S. Application Data

(60) Provisional application No. 62/943,450, filed on Dec. 4, 2019.

(30) Foreign Application Priority Data

Aug. 10, 2020 (TW) ................................ 109127043

(51) Int. Cl.
G09G 3/20 (2006.01)
(52) U.S. Cl.
CPC ....... *G09G 3/20* (2013.01); *G09G 2310/0275* (2013.01)

(58) Field of Classification Search
CPC ... G09G 2300/0452; G09G 2310/0264; G09G 2310/027; G09G 2310/0275; G09G 3/2003
See application file for complete search history.

(56) References Cited

U.S. PATENT DOCUMENTS

| 2017/0125506 A1* | 5/2017 | Kim | .................... H01L 27/3265 |
| 2018/0190730 A1* | 7/2018 | Oho | .................... H01L 51/5203 |
| 2020/0380920 A1* | 12/2020 | Lee | ....................... G09G 3/3291 |

FOREIGN PATENT DOCUMENTS

| CN | 106652944 | 11/2018 |
| CN | 110531557 | 12/2019 |

* cited by examiner

*Primary Examiner* — Gerald Johnson
(74) *Attorney, Agent, or Firm* — JCIPRNET

(57) ABSTRACT

A display device includes a plurality of pixel structures, a plurality of first connection conductive wires and a plurality of second connection conductive wires. Each of the pixel structures includes a plurality of sub-pixels structures respectively corresponding to a plurality of display wavelengths. The sub-pixels structures are respectively coupled to a plurality of first data lines and second data lines. Each of the first connection conductive wires connects two of the first data lines coupled to two of the sub-pixels corresponding to same display wavelength. Each of the second connection conductive wires connects two of the second data lines coupled to two of the sub-pixels corresponding to same display wavelength.

11 Claims, 8 Drawing Sheets

DISPLAY DEVICE

CROSS-REFERENCE TO RELATED APPLICATION

This application claims the priority benefits of U.S. provisional application No. 62/943,450, filed on Dec. 4, 2019 and Taiwan application no. 109127043, filed on Aug. 10, 2020. The entirety of each of the above-mentioned patent applications is hereby incorporated by reference herein and made a part of this specification.

BACKGROUND

Field of the Disclosure

The disclosure relates to a display device, and in particular, to a display device that can increase light transmittance.

Description of Related Art

With the common application of electronic devices, the diversification of display devices has been the current trend for development. Corresponding to the trend, the shape of the display device is no longer limited to a rectangle, and may be designed with a variety of different shapes.

Due to the limitation of the display device, the configuration positions of the gate driver and the source driver will be limited. For this reason, a configuration for vertically feeding the gate line is provided. In this type of display device, in order to provide a configuration space for the gate line that is fed in a vertical direction, a part of the area in the pixel structure will be occupied, and the light transmittance of the display pixel will decrease, which will affect the display performance of the display device.

SUMMARY OF THE DISCLOSURE

The disclosure provides a display device that can effectively increase light transmittance.

A display device of the disclosure includes a plurality of pixel structures, a plurality of first connection conductive wires and a plurality of second connection conductive wires. A pixel structure forms a pixel array. Each of the pixel structures includes a plurality of sub-pixels structures respectively corresponding to a plurality of display wavelengths. The sub-pixels structures are respectively coupled to a plurality of first data lines and second data lines. Each of the first connection conductive wires connects two of the first data lines coupled to two of the sub-pixel structures corresponding to the same display wavelength. Each of the second connection conductive wires connects two of the second data lines coupled to two of the sub-pixel structures corresponding to the same display wavelength.

Based on the above, the disclosure utilizes a pixel structure with dual data lines to form a pixel array. In the meantime, in the sub-pixel structure with the same display wavelength, the data lines corresponding to the same polarity are connected to each other. In this manner, the area occupied by wiring in the pixel array can be reduced, and the light transmittance of the pixel structure can be improved.

DESCRIPTION OF EMBODIMENTS

Figure 1:
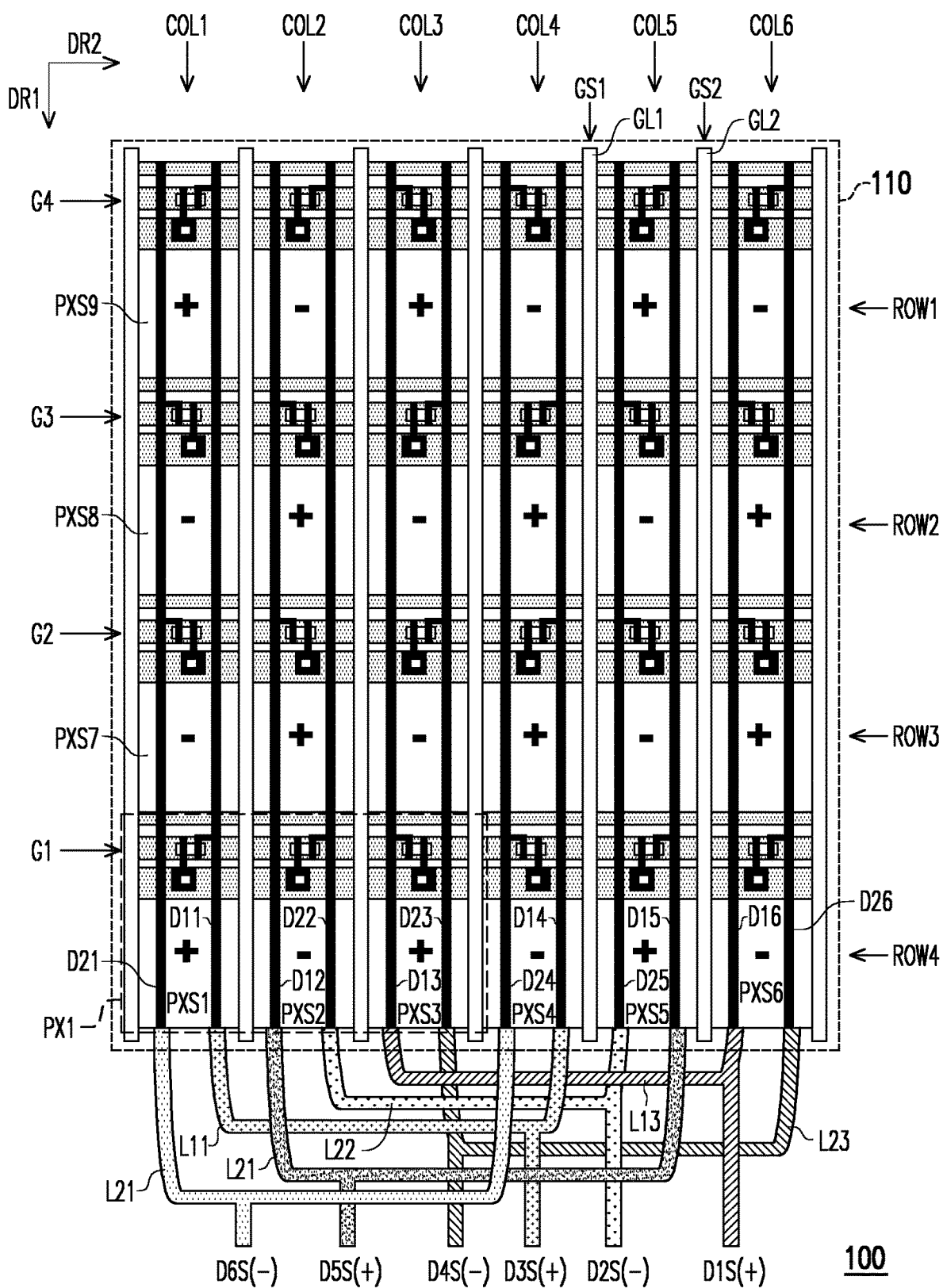
FIG. 1 is a schematic view of a display device according to an embodiment of the disclosure.

Please refer to FIG. 1, which illustrates a schematic view of a display device according to an embodiment of the disclosure. The display device 100 includes a pixel array 110 formed by a plurality of pixel structures, a plurality of first connection conductive wires L11 to L13, and a plurality of second connection conductive wires L21 to L23. Taking the pixel structure PX1 as an example, the pixel structure PX1 includes a plurality of sub-pixel structures PXS1 to PXS3, wherein the sub-pixel structures PXS1 to PXS3 correspond to three different display wavelengths respectively. For example, the sub-pixel structures PXS1 to PXS3 are red pixels, green pixels, and blue pixels, respectively. In this embodiment, each of the sub-pixel structures PXS1 to PXS3 is respectively coupled to a plurality of first data lines D11 to D13, and is respectively coupled to a plurality of second data lines D21 to D23. Specifically, the first data lines D11 to D13 are configured to respectively transmit a plurality of first data signals D3S(+), D5S(+), and D1S(+) with a first polarity, and the second data lines D21 to D23 are configured to respectively transmit a plurality of second data signals D6S(−), D2S(−) and D4S(−) having the second polarity. In this embodiment, the first polarity is positive polarity, and the second polarity is negative polarity opposite to the first polarity.

In this embodiment, another pixel structure adjacent to the pixel structure PX1 includes sub-pixel structures PXS4 to PXS6. Specifically, the sub-pixel structures PXS4 to PXS6 respectively correspond to different display wavelengths, and the display wavelengths corresponding to the sub-pixel structures PXS4 to PXS6 are the same as the display wavelengths corresponding to the sub-pixel structures PXS1 to PXS3, respectively.

On the other hand, the first connection conductive wires L11 to L13 and the second connection conductive wires L21 to L23 are arranged on one side of the pixel array 110. Specifically, the second connection conductive wire L21 connects the second data line D21 to the second data line D24. The second data line D21 and the second data line D24 are respectively coupled to the sub-pixel structures PXS1 and PXS4, and the sub-pixel structures PXS1 and PXS4 correspond to the same display wavelength (both are red pixels). The first connection conductive wire L11 connects the first data line D11 to the first data line D14, wherein the first data line D11 and the first data line D14 are respectively coupled to the sub-pixel structures PXS1 and PXS4 corresponding to the same display wavelength. In addition, the first connection conductive wire L12 connects the first data line D12 to the first data line D15, wherein the first data line D12 and the first data line D15 are respectively coupled to the sub-pixel structures PXS2 and PXS5 corresponding to the same display wavelength. The second connection conductive wire L22 connects the second data line D22 to the second data line D25, wherein the second data line D22 and the second data line D25 are respectively coupled to the sub-pixel structures PXS2 and PXS5 corresponding to the same display wavelength. The first connection conductive wire L13 connects the first data line D13 to the first data line D16, wherein the first data line D13 and the first data line D16 are respectively coupled to the sub-pixel structures PXS3 and PXS6 corresponding to the same display wavelength. Furthermore, the second connection conductive wire L23 connects the second data line D23 to the second data line D26, wherein the second data line D23 and the second data line D26 are respectively coupled to the sub-pixel structures PXS3 and PXS6 corresponding to the same display wavelength.

In this embodiment, the first connection conductive wires L11 to L13 are respectively configured to transmit the first data signals D3S(+), D5S(+) and D1S(+), and the second connection conductive wires L21 to L23 are respectively configured to transmit the second data signals D6S(−), D2S(−) and D4S(−).

In the pixel array 110 of this embodiment, there are a plurality of sub-display columns COL1 to COL6 and sub-display rows ROW1 to ROW4 formed by sub-pixel structures. In addition, there are a plurality of gate signal transmission lines GL1 to GL2 on the pixel array 110. The gate signal transmission lines GL1 to GL2 respectively correspond to part of the sub-display columns COL5 and COL6 among the sub-display columns COL1 to COL6 so as to be arranged along the first direction DR1, and respectively receive the gate scanning signals GS1 to GS2. In this embodiment, the first direction DR1 is consistent with the extension direction of each of the sub-display columns COL1 to COLE. Moreover, the pixel array 110 further has gate lines G1 to G4. The gate lines G1 to G4 respectively correspond to the sub-display rows ROW1 to ROW4, and are arranged along the second direction DR2. Specifically, the second direction DR2 is consistent with the extending direction of each of the sub-display rows ROW1 to ROW4. The gate signal transmission lines GL1 to GL2 and the gate lines G1 to G4 can be arranged on different conductive wire layers. Each of the gate lines G1~G4 can be coupled to any one of the gate signal transmission lines GL1 to GL2 through vias, and receive the corresponding gate scanning signal accordingly.

Incidentally, in this embodiment, take the sub-display column COL1 as an example, the sub-pixel structures PXS9, PXS8, PXS7, and PXS1 arranged in sequence are respectively the first polarity, the second polarity, the second polarity, and the first polarity, wherein the first polarity and the second polarity are positive polarity and negative polarity respectively.

Incidentally, the display device 100 of this embodiment is suitable for non-rectangular display panels, such as curved, circular, semicircular, and elliptical display panels.

In this embodiment, by making the pixel structure corresponding to the same display wavelength and having the same polarity to receive the data signal (the first data signal or the second data signal) from the first connection conductive wire or the second transmission wire, it is possible to reduce the layout complexity of the pixel array and effectively improve the light transmittance of the pixel array.

Figure 2:
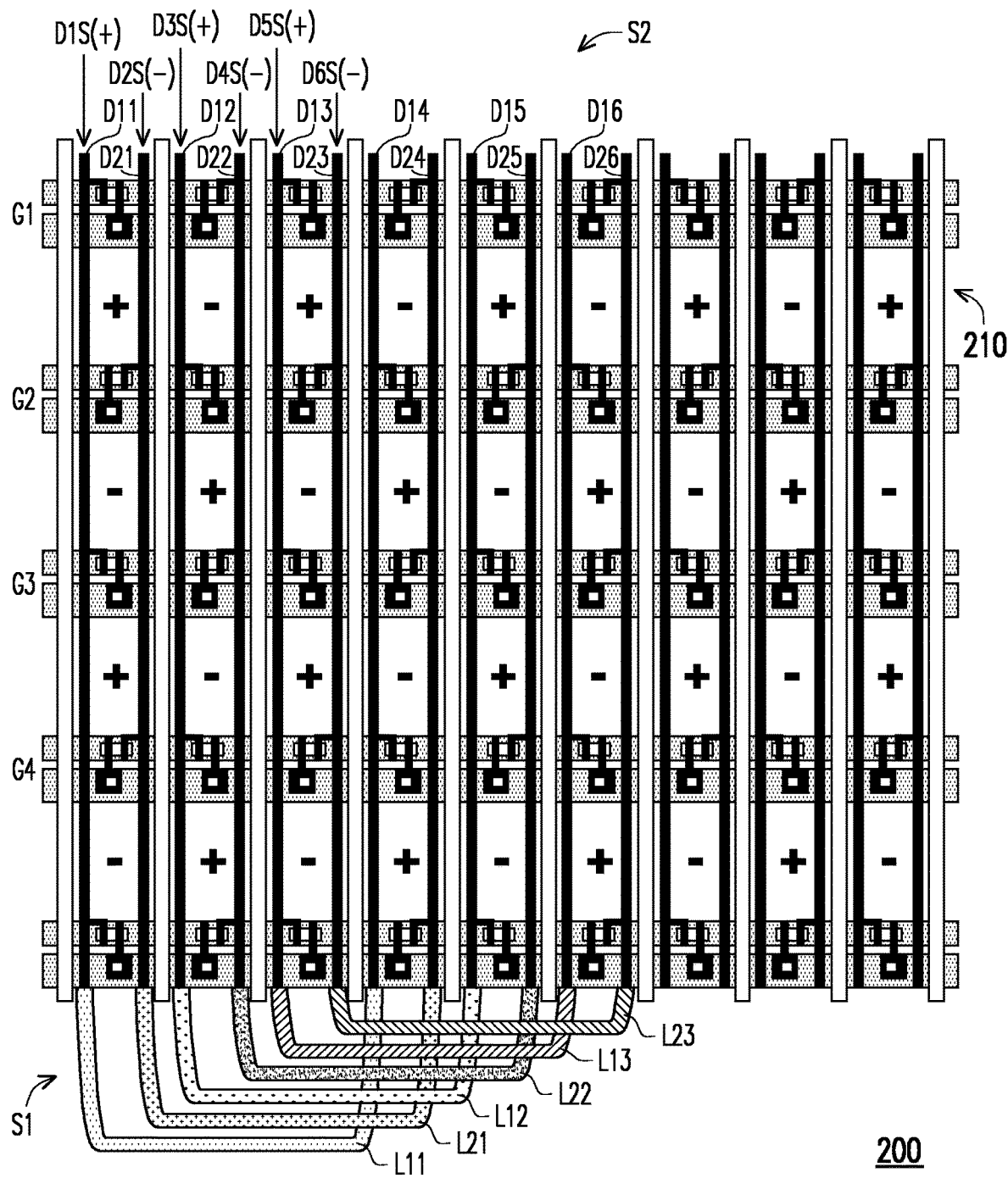
FIG. 2 is a schematic view of a display device according to another embodiment of the disclosure.

Please refer to FIG. 2 below. FIG. 2 is a schematic view of a display device according to another embodiment of the disclosure. The display device 200 includes a pixel array 210 formed of a plurality of pixel structures, a plurality of first connection conductive wires L11 to L13, and a plurality of second connection conductive wires L21 to L23. In this embodiment, the sub-pixel structures PXS1 to PXS3 belong to the same pixel structure, and the sub-pixel structures PXS4 to PXS6 belong to another same pixel structure.

The sub-pixel structures PXS1 to PXS6 are respectively coupled to the first data lines D11 to D16, and are respectively coupled to the second data lines D21 to D26. Specifically, the first data lines D11 to D16 are configured to transmit data signals with the first polarity (for example, the first data signals D1S(+), D3S(+), D5S(+)), and the second data lines D21 to D26 are configured to transmit data signals with the second polarity (for example, the second data signals D2S(−), D4S(−), D6S(−)). The first polarity is opposite to the second polarity.

Based on the display wavelengths respectively corresponding to the sub-pixel structures PXS1 to PXS3, which are respectively the same as the display wavelengths respectively corresponding to the sub-pixel structures PXS4 to PXS6, the first connection conductive wire L11 is connected between the first data lines D11 and D14; the first connection conductive wire L12 is connected between the first data lines D12 and D15; the first connection conductive wire L13 is connected between the first data lines D13 and D16; the second connection conductive wire L21 is connected between the second data lines D21 and D24; the second connection conductive wire L22 is connected between the second data lines D22 and D25; and the second connection conductive wire L21 is connected between the second data lines D23 and D26.

In this embodiment, the first data lines D11, D12, and D13 receive the first data signals D1S(+), D3S(+), and D5S(+), respectively. Moreover, the first data signals D1S(+), D3S(+), and D5S(+) can be respectively transmitted to the first data lines D14, D15, and D16 through the first connection conductive wires L11 to L13. In addition, the second data lines D21, D22, and D23 respectively receive the second data signals D2S(−), D4S(−), and D6S(−). Moreover, the second data signals D2S(−), D4S(−), and D6S(−) can be respectively transmitted to the second data lines D24, D25, and D26 through the second connection conductive wires L21 to L23.

Incidentally, in this embodiment, the polarities of adjacent sub-pixel structures in the same sub-display column are opposite.

In addition, in this embodiment, the first connection conductive wires L11 to L13 and the second connection conductive wires L21 to L23 can be arranged on a first side S1 of the pixel array 210, and the first data signals D1S(+), D3S(+), D5S(+) and the second data signals D2S(−), D4S(−), and D6S(−) can be fed to the first data lines D11, D12, D13 and the second data lines D21, D22, and D23 from a second side S2 of the pixel array 210. Specifically, the first side S1 is opposite to the second side S2.

Figure 3:
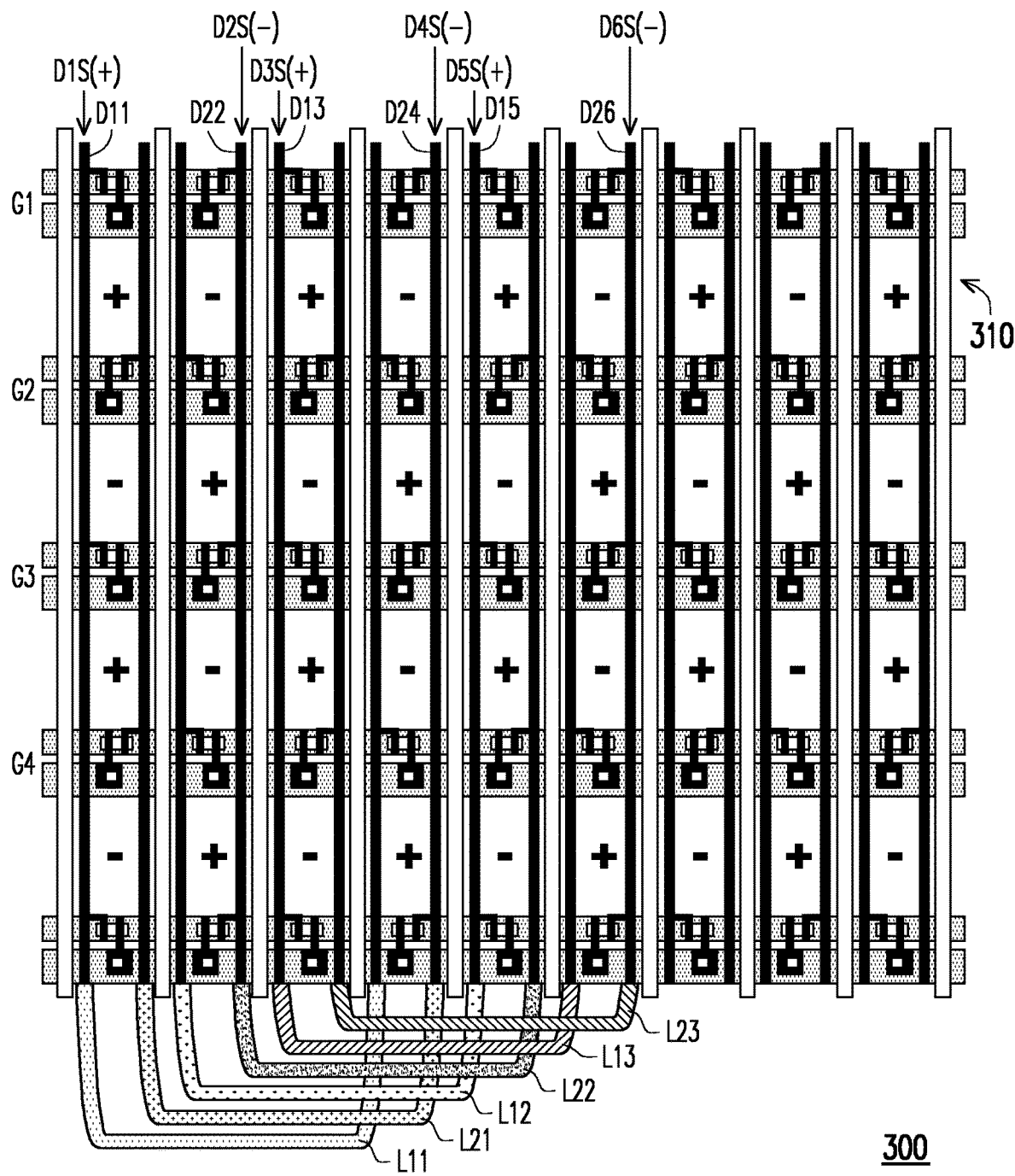
FIG. 3 is a schematic view of a display device according to still another embodiment of the disclosure.

Next, please refer to FIG. 3, which is a schematic view of a display device according to still another embodiment of the disclosure. The display device 300 includes a pixel array 310 formed of a plurality of pixel structures, a plurality of first connection conductive wires L11 to L13, and a plurality of second connection conductive wires L21 to L23. The hardware configuration architecture of the pixel array 310, the plurality of first connection conductive wires L11 to L13, and the plurality of second connection conductive wires L21 to L23 of this embodiment is the same as that of the embodiment of FIG. 2; therefore, no repetition will not be narrated herein. It is worth noting that in this embodiment, the first data signals D1S(+), D3S(+), and D5S(+) are respectively transmitted to the first data lines D11, D13, and D15; the second data signal D2S(−), D4S(−), D6S(−) are respectively transmitted to the second data lines D22, D24, and D26.

The difference between the present embodiment and the embodiment in FIG. 2 is that the feeding point of the first data signals D1S(+), D3S(+), D5S(+) and the second data signals D2S(−), D4S(−), and D6S(−) can be adjusted adaptively with no specific restrictions.

Figure 4:
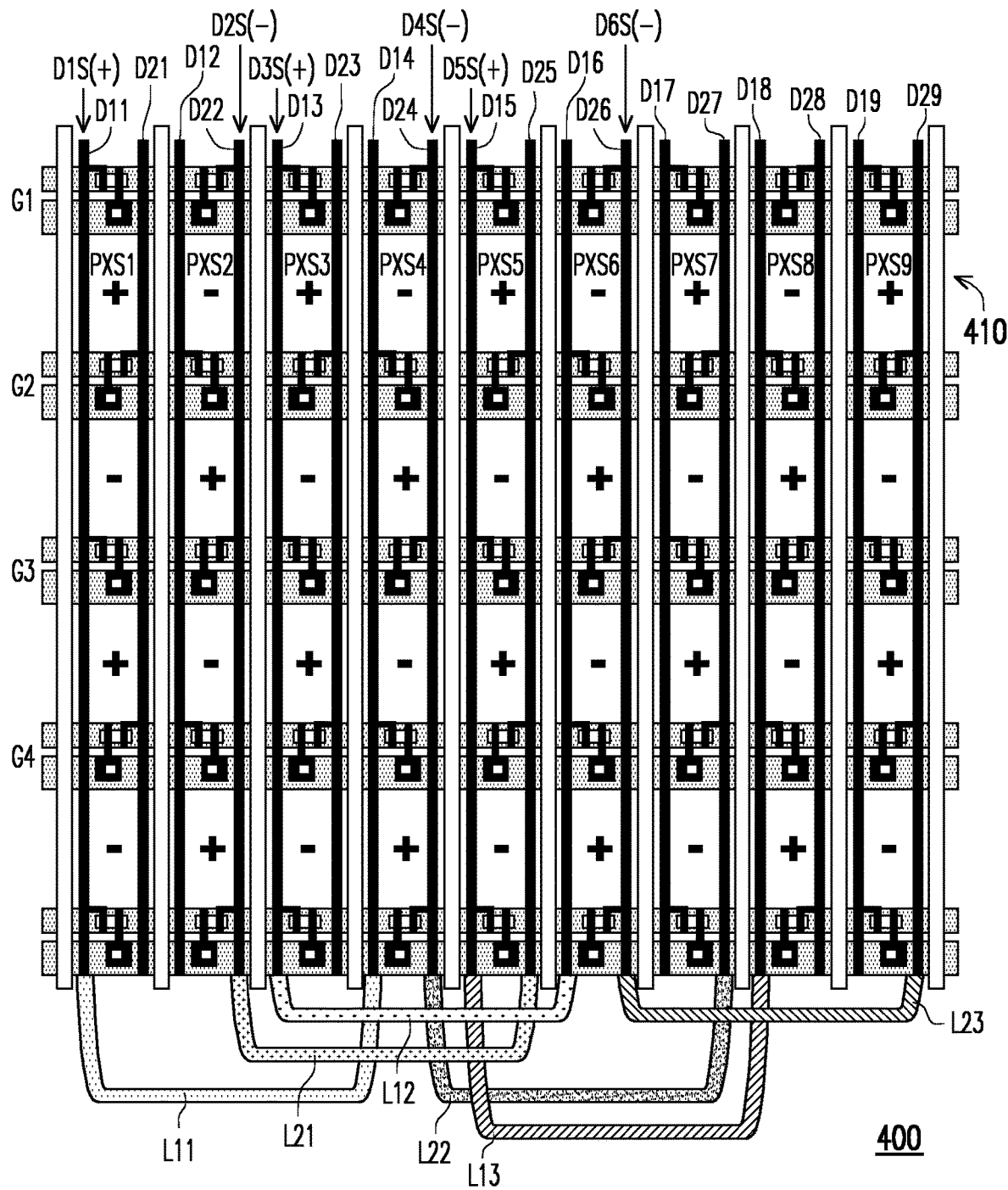
FIG. 4 is a schematic view of a display device according to yet another embodiment of the disclosure.

Please refer to FIG. 4, which is a schematic view of a display device according to yet another embodiment of the disclosure. The display device 400 includes a pixel array 410 formed of a plurality of pixel structures, a plurality of first connection conductive wires L11 to L13, and a plurality of second connection conductive wires L21 to L23. In this embodiment, the sub-pixel structures PXS1 to PXS9 are arranged in a display row. The sub-pixel structures PXS1 to PXS3 form a first pixel structure; the sub-pixel structures PXS4 to PXS6 form a second pixel structure; and the sub-pixel structures PXS7 to PXS9 form a third pixel structure. Specifically, the sub-pixel structures PXS1, PXS4, and PXS7 correspond to the same first display wavelength; the sub-pixel structures PXS2, PXS5, and PXS8 correspond to the same second display wavelength; and the sub-pixel structures PXS3, PXS6, and PXS9 correspond to the same third display wavelength. Moreover, the sub-pixel structures PXS1, PXS3, PXS5, PXS7, and PXS9 have the same positive polarity, and the sub-pixel structures PXS2, PXS4, PXS6, and PXS8 have the same negative polarity.

In addition, the first connection conductive wire L11 is configured to connect the first data lines D11 and D14; the first connection conductive wire L12 is configured to connect the first data lines D13 and D16; the first connection conductive wire L13 is configured to connect the first data lines D15 and D18; the second connection conductive wire L21 is configured to connect the second data lines D22 and D25; the second connection conductive wire L22 is configured to connect the second data lines D24 and D27; and the second connection conductive wire L23 is configured to connect the second data lines D26 and D29. On the other hand, the first data line D11 is configured to receive the first data signal D1S(+), and can transmit the first data signal D1S(+) to the first data line D14 through the first connection conductive wire L11; the second data line D22 is configured to receive the second data signal D2S(−), and can transmit the second data signal D2S(−) to the second data line D25 through the second connection conductive wire L21; the first data line D13 is configured to receive the first data signal D3S(+), and can transmit the first data signal D3S(+) to the first data line D16 through the first connection conductive wire L12; the second data line D24 is configured to receive the second data signal D4S(−), and can transmit the second data signal D4S(−) to the second data line D27 through the second connection conductive wire L22; the first data line D15 is configured to receive the first data signal D5S(+), and can transmit the first data signal D5S(+) to the first data line D18 through the first connection conductive wire L13; the second data line D26 is configured to receive the second data signal D6S(−), and can transmit the second data signal D6S(−) to the second data line D29 through the second connection conductive wire L23.

In this embodiment, the pixel structure formed by the sub-pixel structures PXS4 to PXS6 is taken as an example. Specifically, a part of the data line can be connected to the data line of the former stage pixel structure (formed by the sub-pixel structures PXS1 to PXS3), wherein another part of the data line can be connected to the data line of the later stage pixel structure (formed by the sub-pixel structures PXS7 to PXS9).

In addition, in the illustration in FIG. 4, although the first data lines D12, D19 and the second data lines D21, D23, and D28 are not shown in connection with other data lines, in actual applications, the first data lines D12, D19 and the second data lines D21, D23, and D28 can be connected to data lines of other stage pixel structures. FIG. 4 only shows the content to be explained, and does not show the connection status of all data lines.

Figure 5:
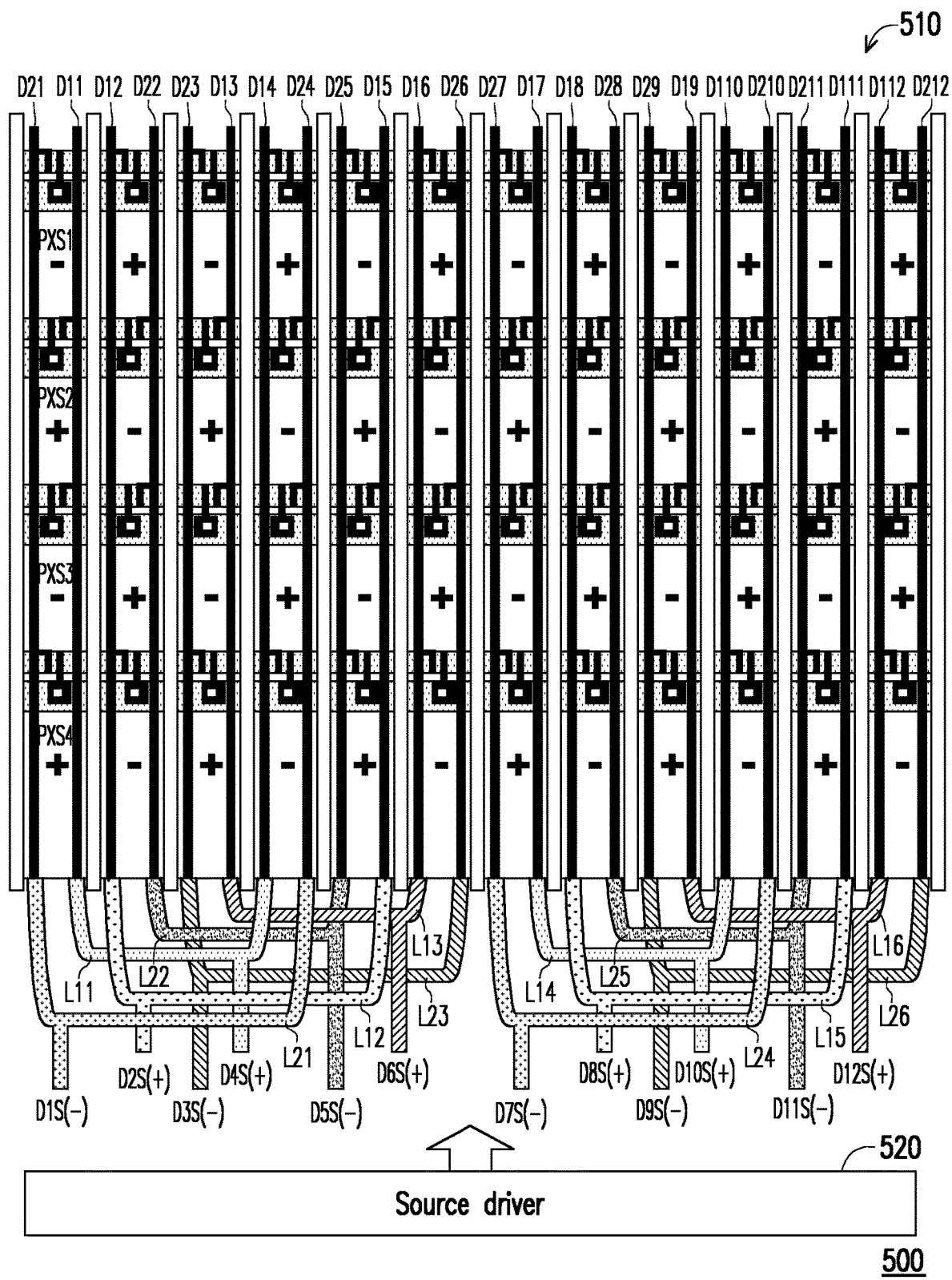
FIG. 5 is a schematic view of a display device according to still another embodiment of the disclosure.

Please refer to FIG. 5 below. FIG. 5 is a schematic view of a display device according to still another embodiment of the disclosure. The display device 500 includes a pixel array 510 formed by a plurality of pixel structures, a source driver 520, first connection conductive wires L11 to L16, and second connection conductive wires L21 to L26. Specifically, the first connection conductive wire L11 connects the first data lines D11 and D14; the first connection conductive wire L12 connects the first data lines D12 and D15; the first connection conductive wire L13 connects the first data lines D13 and D16; the first connection conductive wire L14 connects the first data lines D17 and D110; the first connection conductive wire L15 connects the first data lines D18 and D111; and the first connection conductive wire L16 connects the first data lines D19 and D112. In addition, the second connection conductive wire L21 connects the second data lines D21 and D24; the second connection conductive wire L22 connects the second data lines D22 and D25; the second connection conductive wire L23 connects the second data lines D23 and D26; the second connection conductive wire L24 connects the second data lines D27 and D210; the second connection conductive wire L25 connects the second data lines D28 and D211; and the second connection conductive wire L26 connects the second data lines D29 and D212.

The source driver 520 is coupled to the first connection conductive wires L11 to L16 and the second connection conductive wires L21 to L26. The source driver 520 provides the first data signals D2S(+), D4S(+), D6S(+), D8S(+), D10S(+), and D12S(+) having positive polarity to the first connection conductive wires L11 to L16 respectively, and provide the second data signal D1S(−), D3S(−), D5S(−), D7S(−), D9S(−), and D11S(−) having negative polarity to the second connection conductive wires L21 to L26 respectively.

In this embodiment, take the sub-pixel structures PXS1 to PXS4 in the first display column as an example, the sub-pixel structures PXS1 to PXS4 have negative, positive, positive, and negative polarities respectively.

Figure 6:
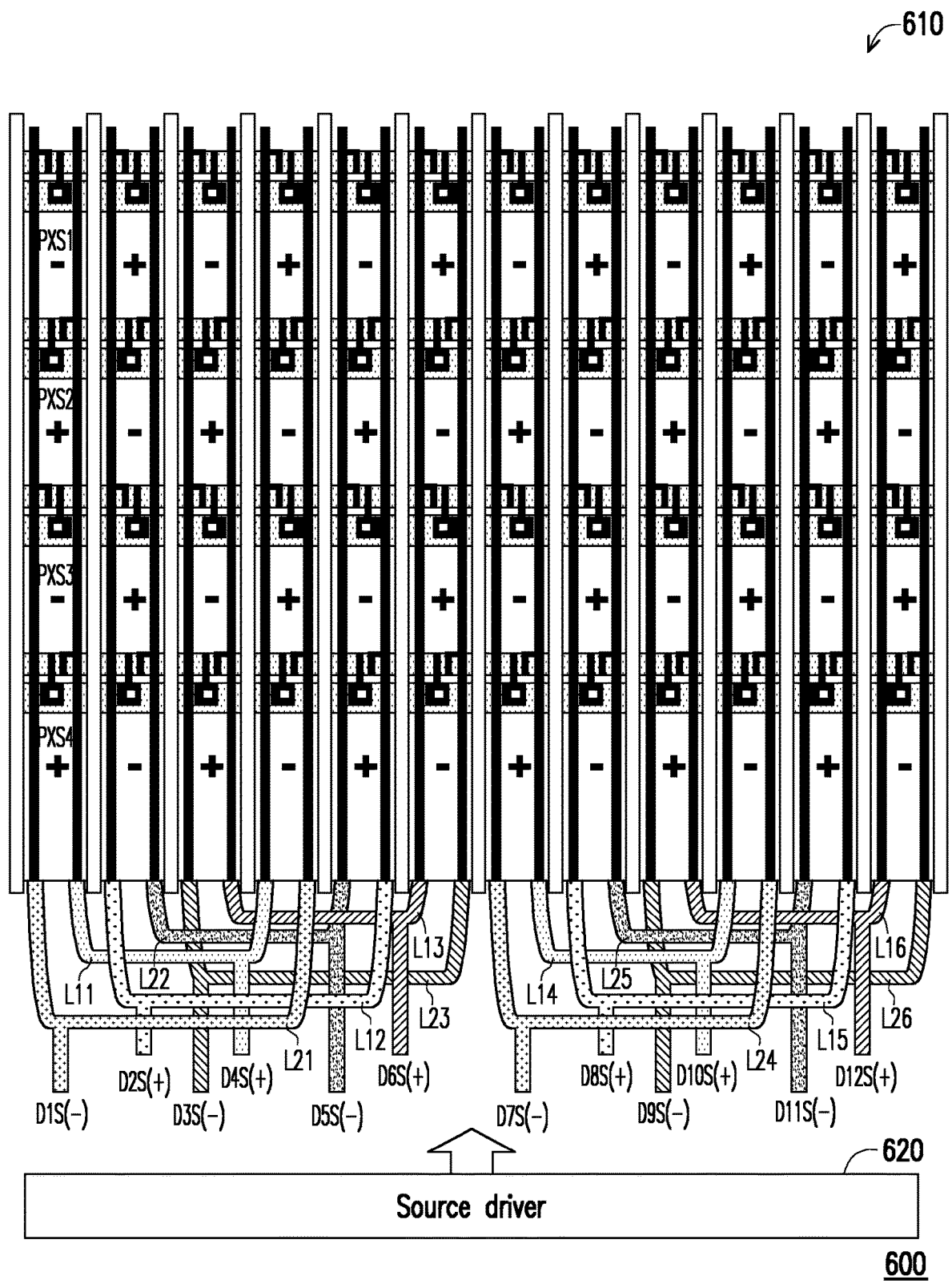
FIG. 6 is a schematic view of a display device according to yet another embodiment of the disclosure.

Please refer to FIG. 6 below. FIG. 6 is a schematic view of a display device according to yet another embodiment of the disclosure. The display device 600 includes a pixel array 610 formed by a plurality of pixel structures, a source driver 620, first connection conductive wires L11 to L16, and second connection conductive wires L21 to L26. In the embodiment of FIG. 6, the connection relationship between the first connection conductive wires L11 to L16 and the second connection conductive wires L21 to L26 and the data lines of the sub-pixel structures is similar to that described in the embodiment of FIG. 5, and therefore no repetition is narrated herein. It is worth noting that in this embodiment, take the sub-pixel structures PXS1 to PXS4 in the first display column as an example, the sub-pixel structures PXS1 to PXS4 have negative polarity, positive polarity, negative polarity, and positive polarity, respectively. In other words, in the same display column, the polarities of two adjacent sub-pixel structures are opposite.

Figure 7:
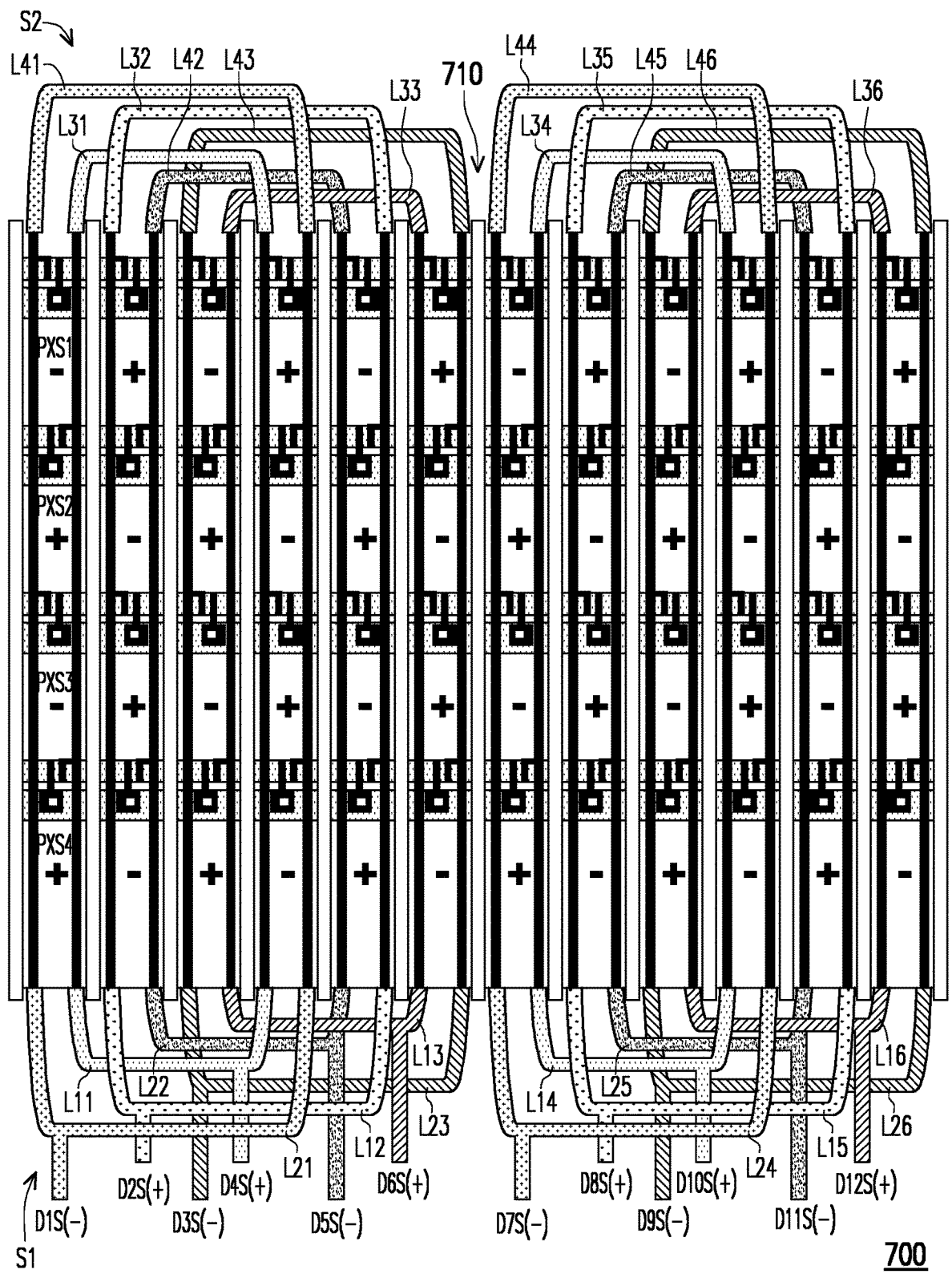
FIG. 7 is a schematic view of a display device according to still another embodiment of the disclosure.

Please refer to FIG. 7 below. FIG. 7 is a schematic view of a display device according to still another embodiment of the disclosure. The display device 700 includes a pixel array 710 formed by a plurality of pixel structures, first connection conductive wires L11 to L16, second connection conductive wires L21 to L26, third connection conductive wires L31 to L36, and fourth connection conductive wires L41 to L46. Specifically, the first connection conductive wires L11 to L16 and the second connection conductive wires L21 to L26 are arranged on the first side S1 of the pixel array 710. Each of the first connection conductive wires L11 to L16 is configured to connect two first data lines in the two sub-pixel structures corresponding to the same display wavelength, and each of the second connection conductive wires L21 to L26 is configured to connect two second data lines in the two sub-pixel structures corresponding to the same display wavelength. Moreover, the third connection conductive wires L31 to L36 and the fourth connection conductive wires L41 to L46 are arranged on the second side S2 of the pixel array 710. Each of the third connection conductive wires L31 to L36 is configured to connect two first data lines in the two sub-pixel structures corresponding to the same display wavelength, and each of the fourth connection conductive wires L41 to L46 is configured to connect two second data lines in the two sub-pixel structures corresponding to the same display wavelength.

In this embodiment, the first connection conductive wires L11 to L16 are respectively connected to the third connection conductive wires L31 to L36, and the second connection conductive wires L21 to L26 are respectively connected to the fourth connection conductive wires L41 to L46.

The first connection conductive wires L11 to L16 and the second connection conductive wires L21 to L26 respectively provide multiple feeding points to respectively receive the first data signals D2S(+), D4S(+), D6S(+), D8S(+), D10S(+), and D12S(+) having positive polarity as well as the second data signals D1S(−), D3S(−), D5S(−), D7S(−), D9S(−), and D11S(−) having negative polarity. In this embodiment, by providing the third connection conductive wires L31 to L36 and the fourth connection conductive wires L41 to L46, it is possible to reduce the transmission impedance of the first data signals D2S(+), D4S(+), D6S(+), D8S(+), D10S(+), D12S(+) and the second data signals D1S(−), D3S(−), D5S(−), D7S(−), D9S(−), and D11S(−) during transmission, thereby ensuring the transmission efficiency and quality of the data signal.

Figure 8:
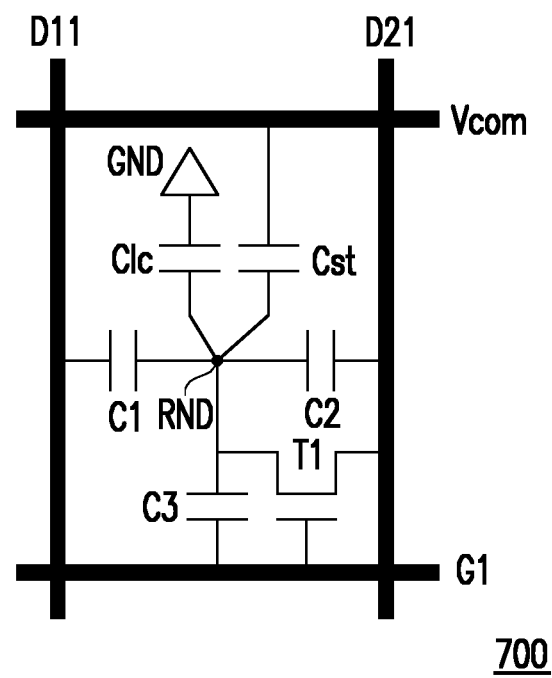
FIG. 8 is a schematic circuit diagram of a sub-pixel structure according to an embodiment of the disclosure.

Please refer to FIG. 8. FIG. 8 illustrates a schematic circuit diagram of a sub-pixel structure according to an embodiment of the disclosure. The sub-pixel structure 800 includes capacitors C1 to C4, a transistor T1, a storage capacitor Cst, and a liquid crystal capacitor Clc. The capacitor C1 is coupled between the first data line D11 and the reference node RND. The capacitor C2 is coupled between the second data line D21 and the reference node RND. The transistor T1 has a first end coupled to the second data line D21; the control end of the transistor T1 is coupled to the gate line G1; the second end of the transistor T1 is coupled to the reference node RND. The capacitor C3 is coupled between the gate line G1 and the reference node RND. The storage capacitor Cst has a first end coupled to the reference node RND, and the second end of the storage capacitor Cst receives the common voltage VCOM. The liquid crystal capacitor Clc has a first end coupled to the reference node RND; and the second end of the liquid crystal capacitor Clc receives the reference voltage GND.

Specifically, the first data line D11 receives a first data signal having a positive polarity, and the second data line D21 receives a second data signal having a negative polarity. It is worth noting that in the embodiment of the disclosure, the first end of the transistor T1 may also be coupled to the first data line D11. When the sub-pixel structure 800 has positive polarity, the first end of the transistor T1 is connected to the first data line D11, and when the sub-pixel structure 800 has negative polarity, the first end of the transistor T1 is connected to the second data line D21.

The sub-pixel structure 800 in this embodiment receives the first data signal and the second data signal having opposite polarities through the first data line D11 and the second data line D21, respectively. The sub-pixel structure 800 can also maintain the balance between the capacitors C1 and C2.

In summary, the display device of the disclosure allows two sub-pixel structures corresponding to the same display wavelength to share data lines that transmit data signals of the same polarity. With the combination of gate signal transmission lines and gate lines arranged in different directions, it is possible to effectively reduce the area occupied by wiring in the pixel structure and effectively increase the light transmittance of the pixel structure.

What is claimed is:
1. A display device, comprising:
    a plurality of pixel structures forming a pixel array, wherein each of the pixel structures comprises a plurality of sub-pixel structures respectively corresponding to a plurality of display wavelengths, and the sub-pixel structures are respectively coupled to a plurality of first data lines and are respectively coupled to a plurality of second data lines;
    a plurality of first connection conductive wires, wherein each of the first connection conductive wires is configured to connect two of the first data lines respectively coupled to two of the sub-pixel structures corresponding to the same display wavelength; and
    a plurality of second connection conductive wires, wherein each of the second connection conductive wires is configured to connect two of the second data lines respectively coupled to two of the sub-pixel structures corresponding to the same display wavelength.

2. The display device according to claim 1, wherein the plurality of first data lines respectively transmit a plurality of first data signals, the plurality of first data signals have a first polarity, the plurality of second data lines respectively transmit a plurality of second data signals, and the plurality of second data signals have a second polarity, the first polarity is opposite to the second polarity.

3. The display device according to claim 1, wherein the plurality of sub-pixel structures corresponding to the same display wavelength form a plurality of sub-display columns, and the two adjacent sub-pixel structures in each of the sub-display columns have opposite polarities.

4. The display device according to claim 1, wherein the plurality of sub-pixel structures corresponding to the same display wavelength form a plurality of sub-display columns, and in each of the sub-display columns, a first sub-pixel structure, a second sub-pixel structure, a third sub-pixel and a fourth sub-pixel structure arranged in sequence respectively have a first polarity, a second polarity, the second polarity, and the first polarity, wherein the first polarity is opposite to the second polarity.

5. The display device according to claim 1, wherein the plurality of first connection conductive wires and the plurality of second connection conductive wires are arranged on a first side of the pixel array.

6. The display device according to claim 1, further comprising:
a plurality of third connection conductive wires, wherein each of the third connection conductive wires is configured to connect two of the first data lines coupled to two of the sub-pixel structures corresponding to the same display wavelength; and
a plurality of fourth connection conductive wires, wherein each of the fourth connection conductive wires is configured to connect two of the second data lines coupled to two of the sub-pixel structures corresponding to the same display wavelength,
wherein, the plurality of third connection conductive wires and the plurality of fourth connection conductive wires are arranged on a second side of the pixel array, and the first side is opposite to the second side.

7. The display device according to claim 1, wherein the plurality of sub-pixel structures corresponding to the same display wavelength form a plurality of sub-display columns, and the display device further comprises:
a plurality of gate signal transmission lines respectively corresponding to a part of the sub-display columns to extend along a first direction, and the plurality of gate signal transmission lines are configured for transmitting a plurality of gate scanning signals.

8. The display device according to claim 1, wherein the plurality of pixel structures form a plurality of sub-display rows, and the display device further comprises:
a plurality of gate lines, respectively corresponding to the plurality of sub-display rows arranged along a second direction,
wherein, the plurality of gate lines are respectively coupled to the plurality of gate signal transmission lines, and the first direction is different from the second direction.

9. The display device according to claim 1, further comprising:
a source driver arranged on one side of the pixel array to provide a plurality of first data signals to the plurality of first connection conductive wires respectively, and provide a plurality of second data signals to the plurality of second connection conductive wires respectively.

10. The display device according to claim 1, wherein each of the sub-pixel structures comprises:
a first capacitor coupled between each of the corresponding first data lines and a reference node;
a second capacitor coupled between each of the corresponding second data lines and the reference node;
a transistor having a first end coupled to each of the corresponding second data lines or each of the second data lines, a control end of the transistor being coupled to a gate line, and a second end of the transistor being coupled to the reference node;
a third capacitor coupled between the gate line and the reference node;
a storage capacitor having a first end coupled to the reference node, and a second end of the storage capacitor receiving a common voltage; and
a liquid crystal capacitor having a first end coupled to the reference node, and a second end of the liquid crystal capacitor receiving a reference voltage.

11. The display device according to claim 10, wherein when each of the sub-pixel structures has a first polarity, the first end of the transistor is coupled to each of the corresponding first data lines, and when each of the sub-pixel structures has a second polarity, the first end of the transistor is coupled to each of the corresponding second data lines, wherein the first polarity is opposite to the second polarity.

* * * * *